G. L. HINSHAW & H. A. WADE.
TRACTION ENGINE.
APPLICATION FILED OCT. 6, 1908.
958,123.
Patented May 17, 1910.
2 SHEETS—SHEET 1.
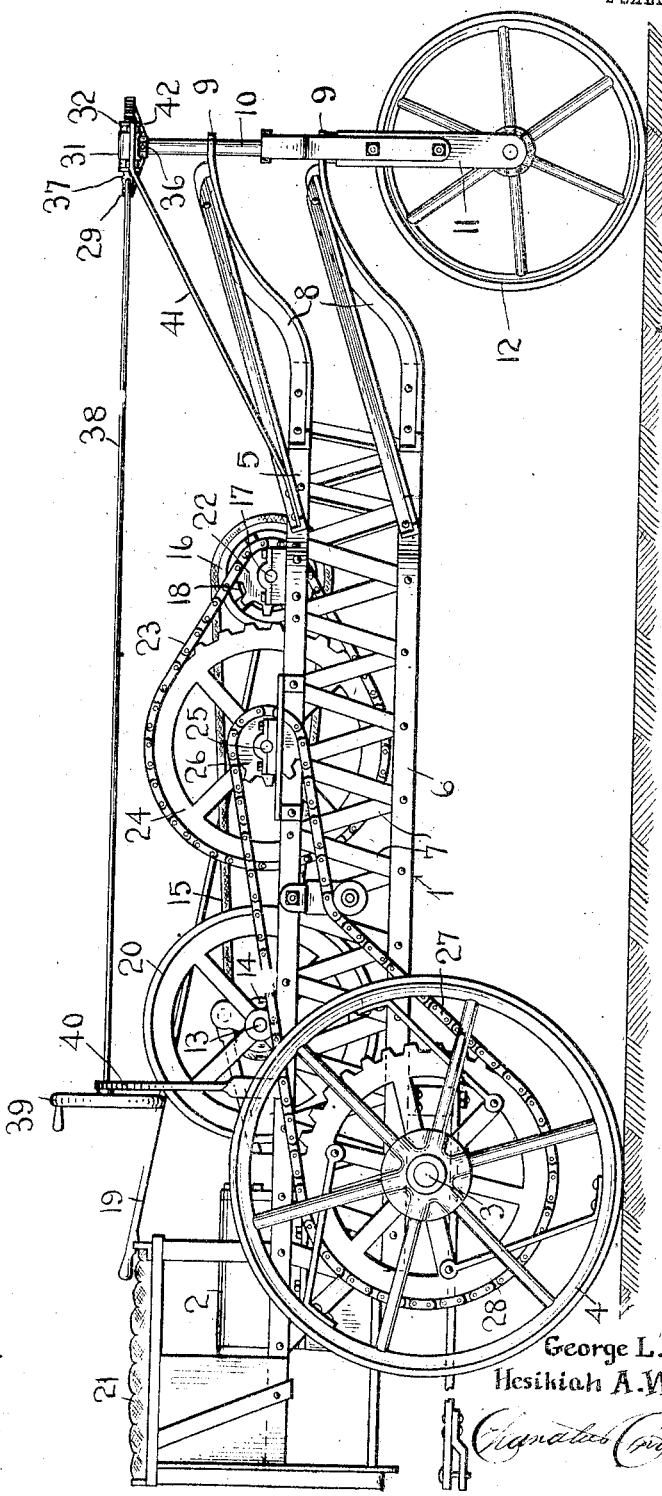
Witnesses
L. B. James
B. E. Cooksey
Inventors
George L. Hinshaw
Hesikiah A. Wade
by
Attorneys G. L. HINSHAW & H. A. WADE.
TRACTION ENGINE.
APPLICATION FILED OCT. 6, 1908.
958,123.
Patented May 17, 1910.
2 SHEETS—SHEET 2.
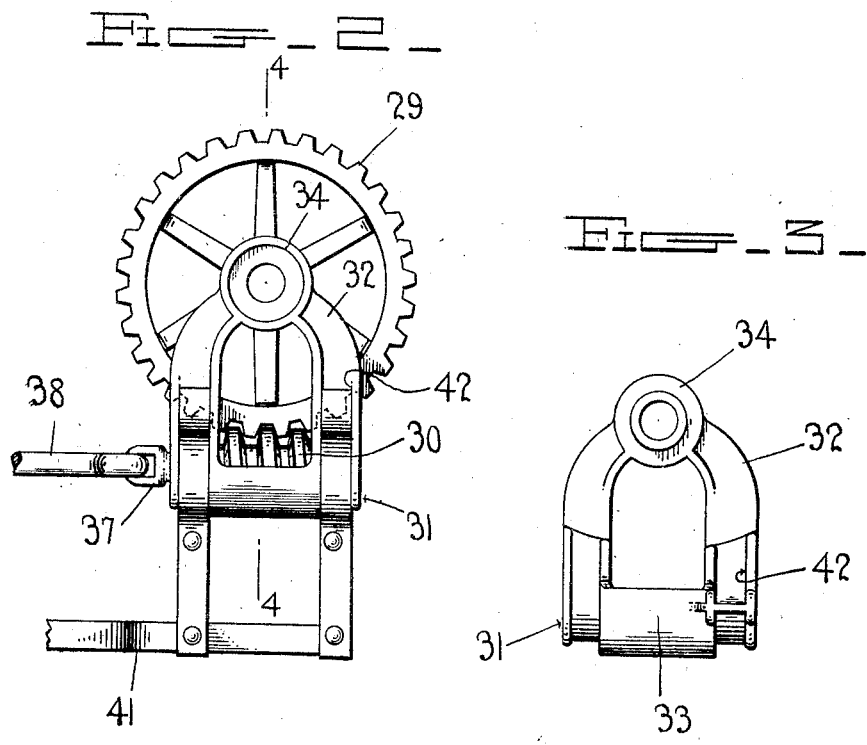
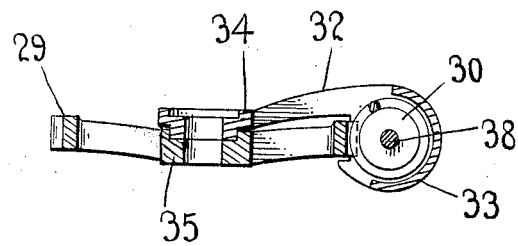
Witnesses
L. B. James
Henry T. Bright
Inventors
George L. Hinshaw
Hesikiah A. Wade
By Chandler & Chandler
Attorneys

UNITED STATES PATENT OFFICE.

GEORGE L. HINSHAW AND HESIKIAH A. WADE, OF PARSONS, KANSAS.

TRACTION-ENGINE.

958,123.  Specification of Letters Patent.  Patented May 17, 1910.

Application filed October 6, 1908. Serial No. 456,405.

*To all whom it may concern:*

Be it known that we, GEORGE L. HINSHAW and HESIKIAH A. WADE, citizens of the United States, residing at Parsons, in the county of Labette, State of Kansas, have invented certain new and useful Improvements in Traction-Engines; and we do hereby declare the following to be a full, clear, and exact description of the invention, such as will enable others skilled in the art to which it appertains to make and use the same.

The present invention has reference to improvements in traction engines, its principal object being the production of an exceedingly durable and powerful engine of that type equipped with a steering mechanism which, owing to its extreme sensitiveness, may be readily and easily manipulated, the details of construction of said mechanism including the more important features of the invention.

To this end, the invention resides in the attachment to the stem of the bracket which carries the front wheel, of a worm wheel which meshes with and is driven by a worm whose casing is likewise connected with the bracket stem, the rotation of the worm being effected by means of a rod attached thereto at one end and provided at the other end with a hand wheel.

The invention further resides in the particular construction of the frame upon which the motor, and the driving connections between the latter and the traction wheels are mounted.

The preferred embodiment of the invention is illustrated in the accompanying drawings, in which corresponding parts are designated by the same reference numerals throughout the several views.

Of the said drawings, Figure 1 is a side elevation of the complete invention. Fig. 2 is an enlarged detail view of the worm and worm gear. Fig. 3 is a bottom plan view of the casing in which the worm is located. Fig. 4 is a transverse sectional view taken on the line 4—4 of Fig. 2.

Referring more particularly to the drawings, 1 designates generally the frame of the machine, 2 the engine mounted thereupon, and 3 the rear or drive axle which carries upon its ends the traction wheels 4.

The frame itself consists of upper and lower skeleton members 5 and 6, whose sides are connected together by a series of zigzag braces 7, the sides of each frame member terminating at their forward ends in trusses 8. The connected free ends of the trusses terminate in collars 9 through which extends the vertical stem portion 10 of an inverted U-shaped bracket 11, the legs of said bracket being provided with alining perforations for the reception of the pin or axle which carries the front wheel 12.

The shaft 13 of the engine has secured thereto at one end, a pulley 14 connected by a belt 15 with a larger pulley 16 loose upon a shaft 17 disposed transversely of the frame and journaled at its ends in bearings mounted upon the sides of the upper member 5. A friction clutch 18 is operated in the usual manner by extending lever 19 which passes between a pair of spaced fly-wheels 20 with which the engine shaft is provided, and terminates within easy reach of the driver who occupies the seat 21 located above the engine.

The shaft 17 carries in addition to the clutch members above referred to, a sprocket 22 connected by a chain 23 with a larger sprocket 24 fast upon a shaft 25 disposed intermediate and parallel with the engine shaft and the shaft 17, said shaft 25 being likewise journaled in bearings which are mounted upon the sides of the upper frame member. This shaft 25 carries a pair of sprockets 26 disposed upon opposite sides of the sprocket 24 and connected by chains 27 with sprockets 28 secured to the rear axle 3, the various connections above mentioned between the engine and the traction wheels effecting the rotation of the latter, as will be apparent.

The steering mechanism by means of which the machine is guided during its travel, consists, primarily, of a worm wheel 29 and a worm 30, the latter being disposed within and carried by a casing 31 which includes spaced upper and lower members 32 and 33. The upper member of the casing extends directly across and above the worm wheel and terminates at its free end in a collar 34 which fits in a cup-shaped seat 35 formed in the hub of the worm wheel, said collar being provided with an opening through which the bracket stem 10 extends. The worm wheel itself is rigidly connected with said stem by a cross pin 36, the lower member of the casing projecting beneath said wheel, as shown in Fig. 1.

The worm 30 which projects at one end beyond its casing is formed at such point with an eye 37 pivotally connected to the forward end of a longitudinally-disposed steering rod 38, whose rear end has secured thereto a hand wheel 39, adjacent which point said rod projects through an opening formed in the upper end of a vertical strap 40 bolted at its lower end to the adjacent side of the upper frame member. Rotation of the hand wheel in either direction will therefore effect a corresponding rotary movement of the worm which is in turn imparted to the worm wheel, thus shifting the position of the steering wheel.

The operation of the machine, as a whole, is believed to be apparent from the foregoing, and an extended description thereof is accordingly omitted.

While the formation of the collar 34 through which the bracket stem projects, and the extension of the upper member of the casing across the worm wheel is sufficient ordinarily to support the casing 31 and to prevent lateral movement thereof, said casing may be further braced by means of an upwardly extending strap 41, whose lower end is secured to the upper frame member 5 and whose upper end is fastened to the upper casing member 32, the sides of which latter are preferably flanged, as indicated by the numeral 42, this construction serving to hold the above-mentioned strap against any tendency toward lateral movement.

What is claimed is:

1. The combination, with a frame, and a pair of supporting wheels, of a rotatable bracket carried by the frame and located in advance of the supporting wheels; a steering wheel carried by said bracket; a worm wheel secured to the stem of said bracket; a casing comprising spaced upper and lower members, one of said members being provided with a bearing having an opening through which said stem extends; a worm disposed within the space between said members and arranged for engagement with said worm wheel; and means for rotating said worm.

2. The combination, with a frame, and a pair of supporting wheels, of a rotatable bracket carried by the frame and located in advance of the supporting wheels; a steering wheel carried by said bracket; a worm wheel secured to the stem of said bracket; a casing comprising spaced upper and lower members extending directly above and below the worm wheel, one of said members being provided with a bearing having an opening through which said stem extends; a worm disposed within the space between said members and arranged for engagement with said worm wheel; a rod connected at one end to said worm; and means secured to the other end of said rod, for rotating the same.

In testimony whereof, we affix our signatures in presence of two witnesses.

GEORGE L. HINSHAW.
HESIKIAH A. WADE.

Witnesses:
G. W. HAWK,
H. A. BRYANT.